(12) United States Patent
Shepherd

(10) Patent No.: US 6,202,766 B1
(45) Date of Patent: Mar. 20, 2001

(54) RELIEF VALVE

(76) Inventor: William L. Shepherd, P.O. Box 131111, Houston, TX (US) 77219-1111

( * ) Notice: Subject to any disclaimer, the term of this patent is extended or adjusted under 35 U.S.C. 154(b) by 0 days.

(21) Appl. No.: 09/275,747

(22) Filed: Mar. 24, 1999

(51) Int. Cl.$^7$ .............................. E21B 10/24; F16C 33/66; F16K 15/14
(52) U.S. Cl. ............................. 175/228; 175/337; 384/93; 137/845; 137/859
(58) Field of Search .................................... 175/227, 228, 175/337, 371; 384/93; 137/845, 859

(56) References Cited

U.S. PATENT DOCUMENTS

| | | | |
|---|---|---|---|
| 3,151,626 | * 10/1964 | Everett | 137/493 |
| 3,401,719 | * 9/1968 | Rosser | 137/493.8 |
| 3,847,234 | 11/1974 | Schumacher . | |
| 4,727,942 | 3/1988 | Galle et al. . | |
| 4,887,675 | 12/1989 | Shotwell . | |
| 5,072,795 | * 12/1991 | Delgado et al. | 175/228 |
| 5,441,120 | * 8/1995 | Dysart | 175/228 |
| 5,490,570 | 2/1996 | Millsapps, Jr. . | |

\* cited by examiner

*Primary Examiner*—David Bagnell
*Assistant Examiner*—Jennifer R. Dougherty
(74) *Attorney, Agent, or Firm*—John R. Casperson

(57) ABSTRACT

In a drill bit which has a reservoir for storing a supply of lubricant, generally grease, a lubricant passage is formed for flow of lubricant from the reservoir to the bearing. A relief port is formed in the drill bit body to connect at least one of the reservoir and the lubricant passage with an outside surface of the drill bit body. A normally-closed relief valve is mounted in the relief port to selectively permit fluid flow through the relief port and protect the lubrication system against changes in pressure, especially increases in pressure on the grease side, such as might be caused by thermal expansion of the grease or the production of off-gases by the grease. The valve is provided in the form of a small screw-in unit capable of separate manufacture and testing and comprises a valve body carrying a flexible diaphragm element. Venting is provided via a puncture in the diaphragm element. The valve can be varied in construction to provide venting in one or both directions at predetermined pressure differences, which need not be the same in both directions.

16 Claims, 4 Drawing Sheets

RELIEF VALVE

BACKGROUND OF THE INVENTION

In one aspect, this invention relates to a diaphragm. In another aspect, this invention relates to a valve. In still another aspect, this invention relates to a drill bit containing a lubrication system including a relief valve.

Drill bits employed in the oil and gas industry typically utilize rolling cutters on the lower end of the bit. The rollers are mounted on bearings or bushings which must be supplied with lubricant in order to prevent premature failure.

Lubricant systems which have been devised to provide such a supply of lubricant typically include a pressure compensator system to maintain the lubricant at approximately the same pressure as the borehole fluids surrounding the drill bit. By equalizing the pressure across the lubricant system seals and across the compensator system diaphragm, the risk of system failure is reduced.

Particularly to protect the seals of the lubricant system against increases in pressure from the lubricant side, however, a relief or vent system is still considered very desirable.

It is an object of this invention to provide a valve for venting a drill bit lubricant system.

It is a further object of this invention to provide such a valve which is capable of being manufactured, tested and shipped apart from the bit.

It is another object of this invention to provide a relief valve which can be easily modified to vent at different pressures, or to check flow in one direction if desired.

SUMMARY OF THE INVENTION

In one embodiment of the invention, there is provided a diaphragm element which can be usefully employed in a valve for venting a lubricant system. The diaphragm element has a disk-shaped inner portion and a torus-shaped outer portion. The torus-shaped outer portion is positioned on an outer periphery of the disk-shaped inner portion. The inner portion is well suited for service as a septum to carry a puncture for venting a lubricant system, while the outer portion is well suited for sealing the peripheral area of the diaphragm, against the passage through a valve.

In another embodiment of the invention, there is provided a valve well suited for putting the above described diaphragm element to good use. The valve comprises a valve body which carries a flexible diaphragm element. The valve body has an inner wall surface which defines a passage having a longitudinal axis extending through the valve body. A first wall element extends across the passage and defines a first aperture. A second wall element extends across the passage and defines a second aperture. The second wall element is parallel to, and at a spaced apart distance from, the first wall element. The flexible diaphragm element extends across the passage between the first wall element and the second wall element. The flexible diaphragm element can be as above described, but generally speaking, will have an inner portion and an outer portion with the inner portion having a puncture to provide a pressure relief path. The diaphragm element is positioned parallel to the first wall element and the second wall element and is spaced apart from the first wall element and the second wall element. The outer portion of the diaphragm element is positioned adjacent to the inner wall surface of the valve body and forms a seal between a periphery of the diaphragm element and the inner wall surface of the valve body.

The pressure at which the valve relieves can be varied by adjusting the thickness of the diaphragm element, the size of the puncture, the size of the unsupported area surrounding the puncture, the diameter of the aperture downstream of the puncture, the distance between the diaphragm and the wall element downstream of the diaphragm, and the material from which the diaphragm is constructed. These factors render it a simple manner to provide a two-way relief valve which relieves at a different pressure in each direction. By misaligning the puncture with the aperture on one side, there can be provided a one-way valve which checks flow in the direction of the misaligned aperture and permits flow in the direction away from the misaligned aperture.

In another embodiment of the invention, there is provided a drill bit well suited for putting the above described valve to good use. The drill bit comprises a drill bit body, a bearing, a cutter, and a lubrication system. The drill bit body has at least one downwardly extending leg having a free end. The bearing is mounted on the free end of the at least one downwardly extending leg. The cutter is mounted on the bearing. A reservoir is formed in the drill bit body for storing a supply of lubricant. A lubricant passage is formed in the drill bit body for flow of lubricant from the reservoir to the bearing. A relief port is formed in the drill bit body which connects at least one of the reservoir and the lubricant passage with an outside surface of the drill bit body. A normally-closed relief valve, which can be as described above, is mounted in the relief port to selectively permit fluid flow through the relief port and protect the lubrication system from excessive pressurization.

DETAILED DESCRIPTION OF THE INVENTION

Figure 1:
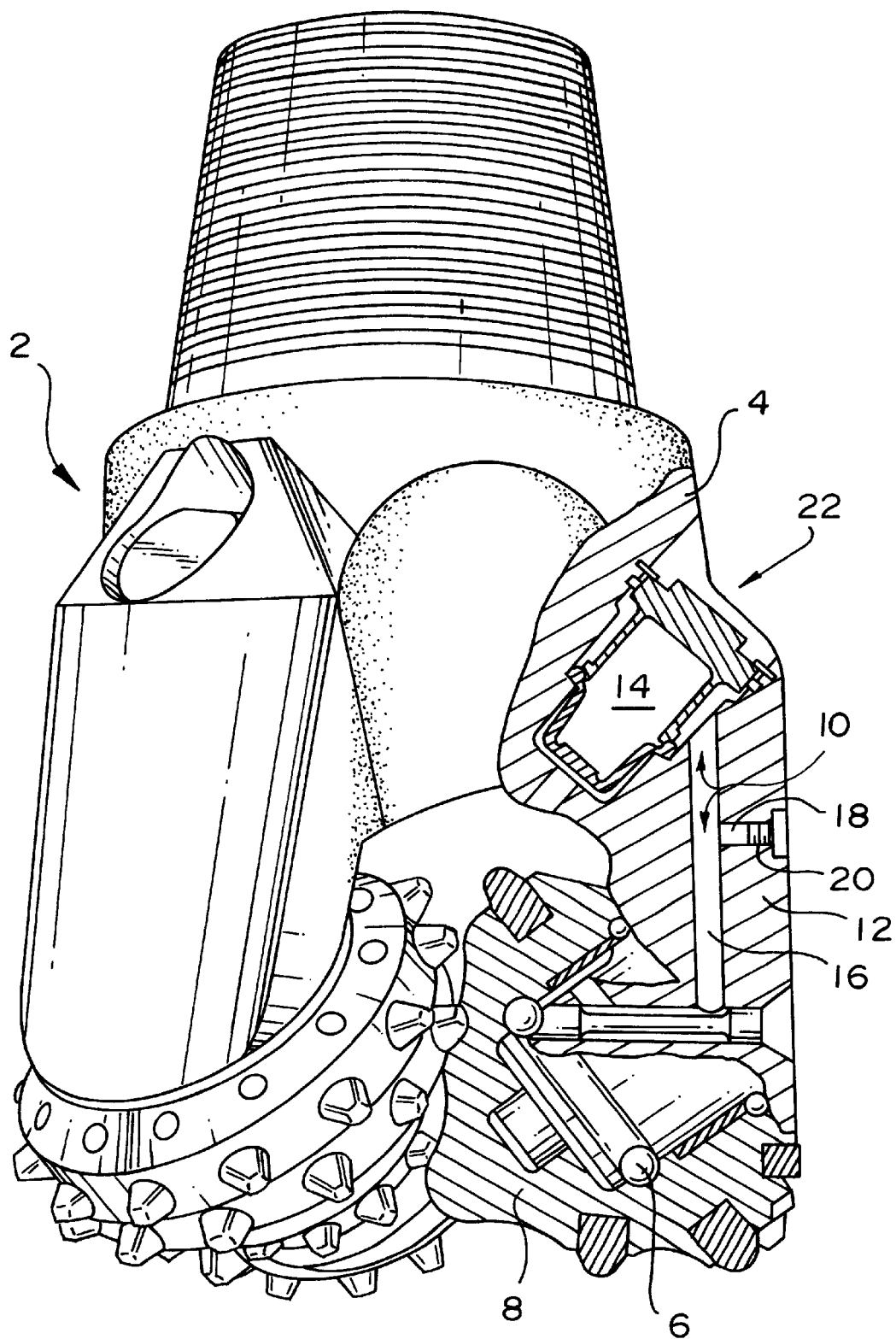
FIG. 1 is a pictorial representation, partly in cross section, showing a drill bit employing a relief valve.

With reference to FIG. 1, a drill bit 2 comprises a drill bit body 4, a bearing 6, a cutter 8, and a lubrication system 10. The drill bit body has at least one downwardly extending leg 12 having a free end. The bearing is mounted on the free end of the at least one downwardly extending leg. The cutter is mounted on the bearing. A reservoir 14 is formed in the drill bit body for storing a supply of lubricant. A lubricant passage 16 is formed in the drill bit body for flow of lubricant from the reservoir to the bearing. A relief port 18 is formed in the drill bit body and connects at least one of the reservoir and the lubricant passage with an outside surface of the drill bit body. A normally-closed relief valve 20 is mounted in the relief port to selectively permit fluid flow through the relief port.

Preferably, and as shown, the relief port connects the lubricant passage with an outside surface of the drill bit body. Also as shown, it is preferable that the reservoir be associated with a pressure compensation system 22 so that the lubricant is generally at substantially the same pressure as the fluid surrounding the outside surface of the bit.

Figure 2:
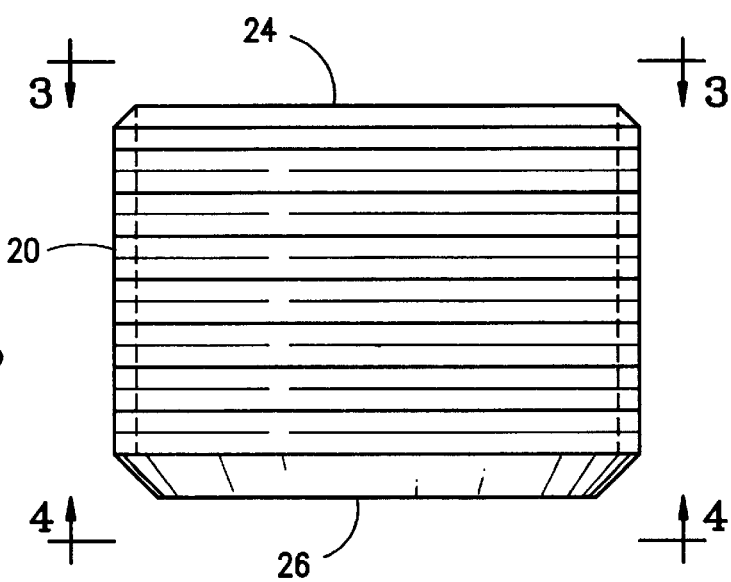
FIG. 2 is a side view of a relief valve in accordance with an embodiment of the invention.

One of the advantages of the invention is that the relief valve 20 is in the form of a unit which can be made and tested apart from the drill bit. In the illustrated embodiment, the valve 20 comprises a valve body which can be manufactured from a pipe plug as shown in FIG. 2. A standard ⅛ inch pipe plug with N.T.P. thread having an outside diameter of approximate ½ inch has been used with good results. The exterior surface of this type of plug is threaded and provided with a taper to form a seal (i.e., it is generally frustoconically shaped). However, it is expected that a valve body having a generally cylindrical outside surface could also be used with good results. The valve body 20 has a first end 24 and a second end 26. A passage extending through the valve body has a first portion 28 extending into the valve body from the first end and a second portion 30 extending into the valve body from the second end. The inner wall surface 34 defining the first portion of the passage preferably has a polygonal cross section in a plane normal to the longitudinal axis of the passage for engagement by a wrench. The inner wall surface 36 defining the second portion of the passage preferably has a generally circular cross section in a plane normal to the longitudinal axis of the passage to facilitate manufacture of the valve body in a machine shop starting with a pipe plug blank.

Figure 3:
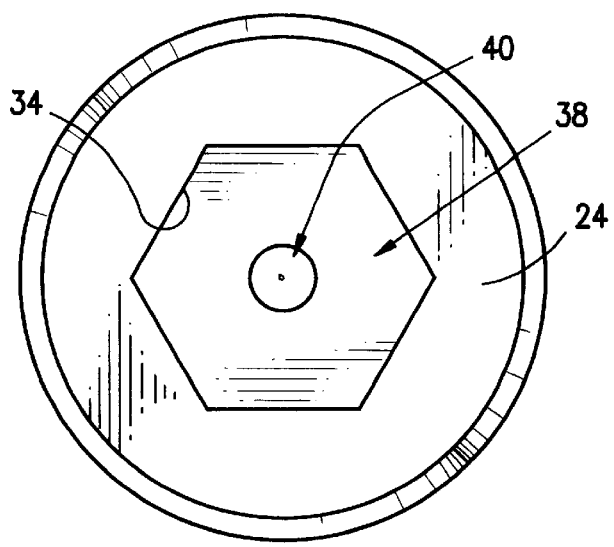
FIG. 3 is an end view of the valve of FIG. 2 taken along lines 3—3.
Figure 5:
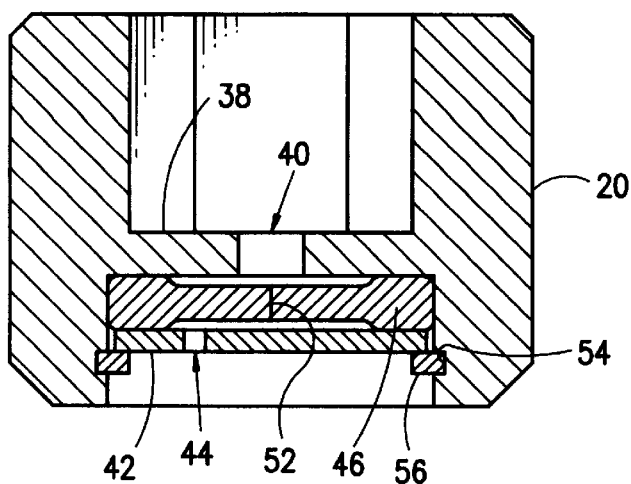
FIG. 5 is a cross sectional view representing the embodiment of the invention shown in FIGS. 2—4.
Figure 6:
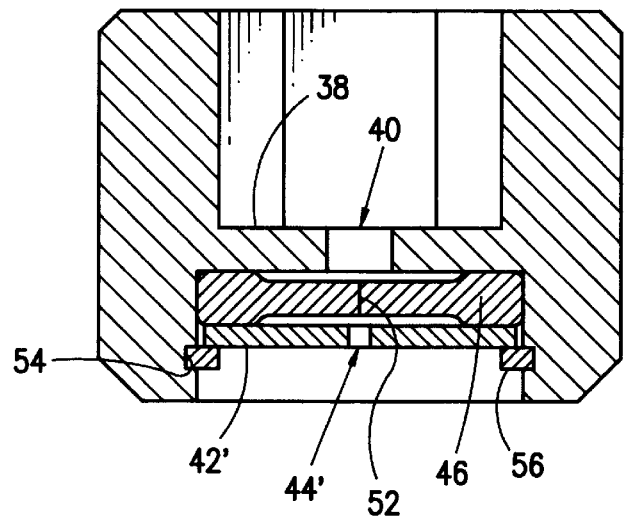
FIG. 6 is a cross sectional view representing another embodiment of the invention.
Figure 7:
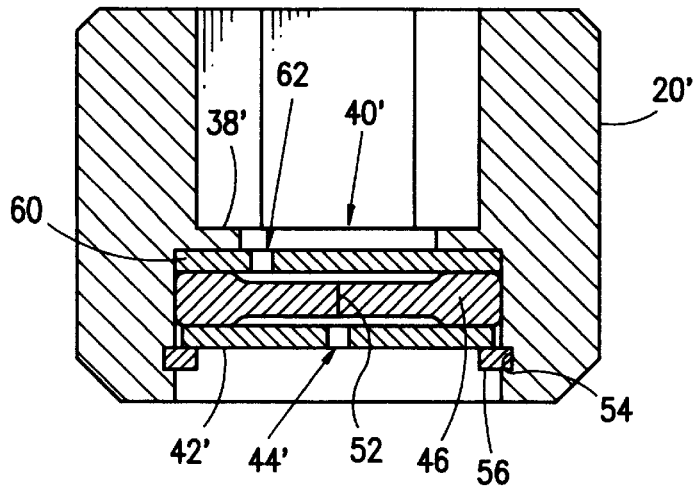
FIG. 7 is a cross sectional view representing another embodiment of the invention.

FIGS. 5–7 illustrate three embodiments of the invention. All three embodiments include a valve body 20 (20' for FIG. 7) having an inner wall surface which defines a passage having a longitudinal axis extending through the valve body. In FIGS. 5 and 6, a first wall element 38 extends across the passage and defines a first aperture 40 (see also FIG. 3). In FIG. 7, a first wall element 38' extends across the passage and defines a first aperture 40'. Preferably, the first wall element is positioned normal to the longitudinal axis of the passage and is defined by a portion of the valve body. The first wall element preferably divides the passage extending through the valve body into the first portion which extends into the valve body from the first end and the second portion which extends into the valve body from the second end.

A second wall element 42 (42' in FIGS. 6 and 7) extends across the passage and defines a second aperture 44 (44' in FIGS. 6 and 7). The second wall element is parallel to, and at a spaced apart distance from, the first wall element.

Figure 8:
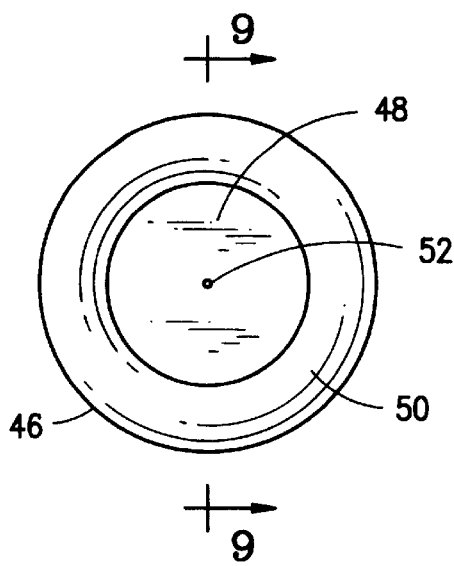
FIG. 8 is a plan view of a diaphragm according to one embodiment of the invention.
Figure 9:
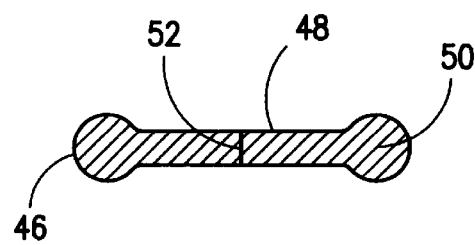
FIG. 9 is a cross sectional view of the diaphragm of FIG. 8 taken along lines 9—9.
Figure 10:
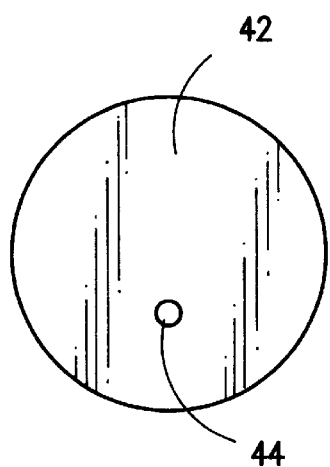
FIG. 10 is a plan view of a portion of the invention shown in FIG. 4.

A flexible diaphragm element 46 extends across the passage between the first wall element and the second wall element. The flexible diaphragm element 46 has an inner portion 48 and an outer portion 50 (See FIGS. 8 and 9). The inner portion has a puncture 52. The inner portion is positioned parallel to the first wall element and the second wall element and is spaced apart from the first wall element and the second wall element. The outer portion of the flexible diaphragm element is positioned adjacent to the inner wall surface of the valve body and forms a seal between a periphery of the diaphragm element and the inner wall surface of the valve body. The puncture 52 extending through the diaphragm element is preferably in alignment with at least one of the first aperture 40 (or 40') and the second aperture 44 (or 44').

Figure 4:
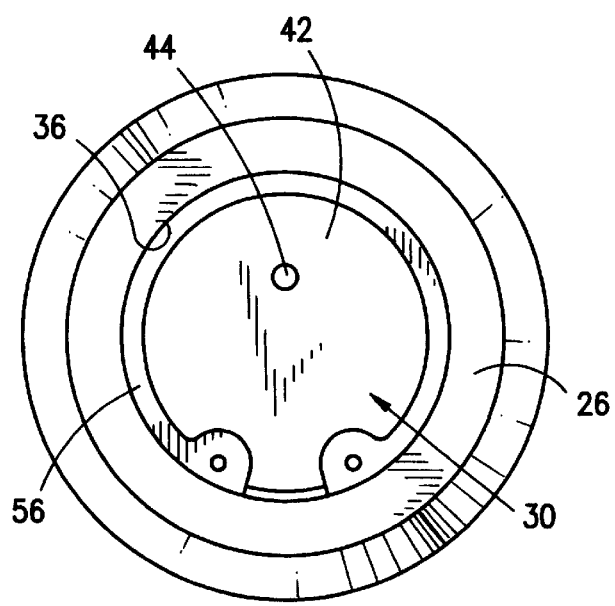
FIG. 4 is an end view of the valve of FIG. 2 taken along lines 4—4.
Figure 11:
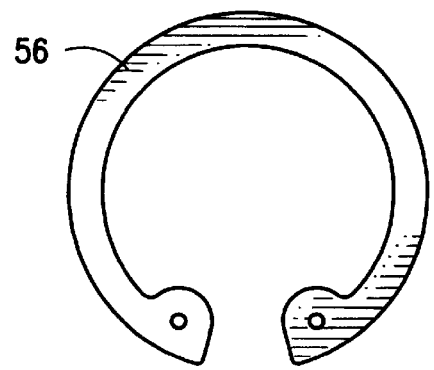
FIG. 11 is a plan view of another portion of the invention shown in FIG. 4.

The inner wall surface of the valve body defining the second portion of the passage preferably defines an annular lock ring groove 54 which is spaced apart from the first wall element. A lock ring 56 (see also FIGS. 4 and 11) is preferably positioned in the groove and retains the second wall element 42 or 42' next to the flexible diaphragm 46.

The inner portion 48 of the diaphragm element is preferably a disk-shaped and the outer portion is preferably torus-shaped and is positioned on an outer periphery of the disk-shaped inner portion. The diaphragm element is preferably rotationally symmetric about a longitudinal axis as well as being symmetric about a plane which is normal to the longitudinal axis. The disk-shaped portion of the diaphragm element is preferably flat and extends diametrically across the torus-shaped portion. These symmetries facilitate assembly of the valve. In use, the inner portion of the diaphragm element forms a septum and the outer portion forms an 0-ring seal. A puncture through the inner portion, such as can be formed with a needle or other sharp object, provides a vent passage. The diaphragm element is generally formed from an elastomeric material. Although a wide variety of elastomers are considered technically suitable, one which has been approved for down hole use is generally preferred. For example HSN (highly saturated nitrile) rubber is highly suitable and has been approved for such use.

Usually, the flexible diaphragm element will be positioned in the second portion of the passage next to the second wall element and is generally normal to the longitudinal axis of the passage. The peripheral torus-shaped outer seal portion 50 contacts the first wall element 38, 38' and the second wall element 42, 42' and spaces the inner disk-shaped septum portion 48 of the diaphragm element apart from the first aperture and the second aperture. The spacing permits the septum to bulge away from the high pressure side of the valve. Whether the valve then eventually relieves depends on the alignment between the puncture and the aperture on the low pressure side of the septum. In the embodiment of the invention shown in FIG. 5, the second wall element 42 is formed by a washer and the aperture 44 defined by the second wall element is positioned off of the longitudinal axis of the passage through the valve body. The valve will vent from the second end to the first end, but will check flow from the first end to the second end. Normally, the valve will be installed in a drill bit with the wrench flats facing outwardly, so the FIG. 5 embodiment will permit venting from the lubricant side of the valve but will check infiltration from the mud side of the valve. The second wall element is positioned next to the lubricant passage and the aperture defined by the second wall element is positioned off of the longitudinal axis of the relief passage so that fluid can flow from the lubricant passage through the relief passage when a predetermined pressure difference is exceeded but is prevented from flowing from the outside surface of the drill bit body and through the relief passage due to contact between the flexible diaphragm and the second wall element.

In the FIG. 6 embodiment, the second wall element 42' is formed by a washer and the aperture 44' defined by the second wall element is positioned on the longitudinal axis of the passage through the valve body. This embodiment will permit venting from either direction. However, because the aperture 40 is larger than the aperture 44', the valve will vent from the lubricant side of the valve at a lower pressure drop than from the mud side of the valve.

In the FIG. 7 embodiment, the aperture on the mud side of the diaphragm is out of alignment with the puncture. Although this could be accomplished by positioned passage 40' off-axis, in the embodiment shown, a second washer 60 defines an off axis aperture 62. (The second washer can be identical to washer 42 shown elsewhere). The second washer is positioned between the diaphragm element 46 and the first wall element 38'. This embodiment provides venting from the mud side of the valve but checks venting from the lubricant side of the valve.

While certain preferred embodiments of the invention have been described herein, the invention is not to be construed as being so limited, except to the extent that such limitations are found in the claims.

What is claimed is:

1. A valve comprising
   a valve body having a generally cylindrical or frustoconically shaped threaded exterior surface, a first end, and a second end, said valve body having an inner wall surface which defines a passage having a longitudinal axis extending through the valve body from the first end to the second end,
   a first wall element extending across the passage and defining a first aperture,
   a second wall element extending across the passage and defining a second aperture,
   wherein the second wall element is parallel to, and at a spaced apart distance from, the first wall element, and
   a flexible diaphragm element extending across the passage between the first wall element and the second wall element, said flexible diaphragm element having an inner portion and an outer portion, wherein the inner portion has a puncture, is positioned parallel to the first wall element and the second wall element, and is spaced apart from the first wall element and the second wall element, and
   wherein the outer portion is positioned adjacent to the inner wall surface of the valve body and forms a seal between a periphery of the diaphragm element and the inner wall surface of the valve body.

2. A valve as in claim 1 wherein the puncture extending through the diaphragm element is in alignment with at least one of the first aperture and the second aperture.

3. A valve as in claim 1 wherein the first wall element is positioned normal to the longitudinal axis of the passage and is defined by a portion of the valve body.

4. A valve as in claim 3, wherein the first wall element divides the passage extending through the valve body into a first portion which extends into the valve body from the first end and a second portion which extends into the valve body from the second end.

5. A valve as in claim 4 where the inner wall surface defining the first portion of the passage has a polygonal cross section in a plane normal to the longitudinal axis of the passage for engagement by a wrench.

6. A valve as in claim 4 wherein the inner wall surface defining the second portion of the passage has a generally circular cross section in a plane normal to the longitudinal axis of the passage and the flexible diaphragm element is positioned in the second portion of the passage next to the second wall element and is generally normal to the longitudinal axis of the passage.

7. A valve as in claim 6 wherein the inner wall surface defining the second portion of the passage defines an annular lock ring groove which is spaced apart from the first wall element, said valve further comprising a lock ring positioned in the groove and retaining the second wall element next to the flexible diaphragm.

8. A valve as in claim 7 wherein the flexible diaphragm element has an inner disk-shaped septum portion and a peripheral torus-shaped outer seal portion, wherein the peripheral torus-shaped outer seal portion contacts the first wall element and the second wall element and spaces the inner disk-shaped septum portion of the diaphragm element apart from the first aperture and the second aperture.

9. A valve as in claim 8 wherein the second wall element is formed by a washer and the aperture defined by the second wall element is positioned on the longitudinal axis of the passage.

10. A valve in claim 9 further comprising second washer defining an aperture, said second washer being positioned between the diaphragm element and the first wall element, the aperture defined by the second washer being positioned off of the longitudinal axis of the passage.

11. A valve as in claim 8 wherein the second wall element is formed by a washer and the aperture defined by the second wall element is positioned off of the longitudinal axis of the passage.

12. A valve as in claim 11 wherein the puncture is positioned on the longitudinal axis of the passage and out of longitudinal alignment with the aperture defined by the second wall element.

13. A drill bit comprising:
   a drill bit body having at least one downwardly extending leg having a free end;
   a bearing mounted on the free end of the at least one downwardly extending leg;
   a cutter mounted on the bearing;
   a reservoir formed in the drill bit body for a storing a supply of lubricant;
   a lubricant passage formed in the drill bit body for flow of lubricant from the reservoir to the bearing;
   a relief port formed in the drill bit body which connects at least one of the reservoir and the lubricant passage with an outside surface of the drill bit body; and
   a normally-closed screw-in relief valve unit mounted in the relief port to selectively permit fluid flow through the relief port,
   wherein the relief valve unit comprises
      a valve body having a generally cylindrical or frustoconically shaped threaded exterior surface, a first end, and a second end and an inner wall surface which defines a relief passage having a longitudinal axis extending through the valve body from the first end to the second end, said valve body being threadably mounted in the relief port,
      a first wall element extending across the relief passage and defining a first aperture,
      a second wall element extending across the relief passage and defining a second aperture,
      wherein the second wall element is parallel to, and at a spaced apart distance from, the first wall element, and
      a flexible diaphragm element extending across the relief passage between the first wall element and the second wall element, said flexible diaphragm element having an inner portion and an outer portion,
      wherein the inner portion has a puncture, is positioned parallel to the first wall element and the second wall element, and is spaced apart from the first wall element and the second wall element, and
      wherein the outer portion is positioned adjacent to the inner wall surface of the valve body and forms a seal between a periphery of the diaphragm element and the inner wall surface of the valve body.

14. A drill bit as in claim 13 wherein the relief port connects the lubricant passage with an outside surface of the drill bit body.

15. A drill bit as in claim 14 wherein the flexible diaphragm element has an inner disk-shaped septum portion and a peripheral torus-shaped outer seal portion, wherein the peripheral torus-shaped outer seal portion contacts the first wall element and the second wall element and spaces the inner disk-shaped septum portion of the diaphragm element apart from the first aperture and the second aperture.

16. A drill bit as in claim 15 wherein the second wall element is positioned next to the lubricant passage and the aperture defined by the second wall element is positioned off of the longitudinal axis of the relief passage so that fluid can flow from the lubricant passage through the relief passage when a predetermined pressure difference is exceeded but is prevented from flowing from the outside surface of the drill bit body and through the relief passage due to contact between the flexible diaphragm and the second wall element.

* * * * *